United States Patent
Ulrich et al.

(10) Patent No.: US 6,459,962 B2
(45) Date of Patent: Oct. 1, 2002

(54) POWER ASSIST VEHICLE

(75) Inventors: Nathan Ulrich, Lee, NH (US); Dana R. Yoerger, North Falmouth, MA (US)

(73) Assignee: DeltaGlide, Inc., Hamden, CT (US)

( * ) Notice: Subject to any disclaimer, the term of this patent is extended or adjusted under 35 U.S.C. 154(b) by 0 days.

(21) Appl. No.: 09/886,874

(22) Filed: Jun. 21, 2001

Related U.S. Application Data

(63) Continuation of application No. PCT/US00/23815, filed on Aug. 30, 2000, and a continuation-in-part of application No. 09/388,124, filed on Aug. 31, 1999.
(60) Provisional application No. 60/272,216, filed on Feb. 28, 2001.

(51) Int. Cl.⁷ ............................. B62D 49/04; B60K 1/00
(52) U.S. Cl. ............................. 701/1; 701/41; 180/65.1; 180/907; 280/250.1
(58) Field of Search ................................. 701/1, 41, 42; 180/907, 65.1, 65.6, 6.5, 6.24, 6.38, 6.44, 6.48; 280/250.1, 304.1, 242.1

(56) References Cited

U.S. PATENT DOCUMENTS

| | | | |
|---|---|---|---|
| 5,113,959 A | 5/1992 | Mastov et al. ............. | 180/11 |
| 5,234,066 A | 8/1993 | Ahsing et al. ............. | 180/6.5 |
| 5,335,741 A | 8/1994 | Rabinovitz et al. ........ | 180/2 |
| 5,356,172 A | 10/1994 | Levy et al. ................ | 280/650 |
| 5,366,037 A | 11/1994 | Richey .................... | 180/65.5 |
| 5,375,676 A | 12/1994 | Takata et al. ............. | 180/206 |
| 5,732,786 A | 3/1998 | Fujigaki .................. | 180/19.3 |
| 5,818,189 A | 10/1998 | Uchiyama et al. .......... | 318/488 |
| 5,878,829 A | 3/1999 | Kanno et al. ............. | 180/65.5 |
| 5,927,414 A | 7/1999 | Kan et al. ................ | 180/19.3 |
| 5,988,661 A | 11/1999 | Garfinkle ................. | 280/250.1 |
| 6,003,627 A | 12/1999 | Ishida .................... | 180/206 |
| 6,015,021 A | 1/2000 | Tanaka et al. ............. | 180/206 |
| 6,059,060 A | 5/2000 | Kanno et al. ............. | 180/65.8 |
| 6,072,292 A | 6/2000 | Uchiyama et al. .......... | 318/376 |
| 6,112,837 A | 9/2000 | Kanno et al. ............. | 180/6.5 |
| 6,155,367 A | 12/2000 | Alber .................... | 180/65.5 |
| 6,202,773 B1 | 3/2001 | Richey, II et al. .......... | 180/6.5 |
| 6,230,831 B1 | 5/2001 | Ogata et al. .............. | 180/65.1 |
| 6,302,226 B1 | 10/2001 | Kanno et al. ............. | 180/6.5 |

FOREIGN PATENT DOCUMENTS

| | | | |
|---|---|---|---|
| EP | 0 526 088 B1 | 2/1993 | ............ A61G/5/00 |
| EP | 0 862 906 A1 | 9/1998 | ............ A61G/5/04 |
| EP | 0 925 771 A1 | 6/1999 | ............ A61G/5/04 |
| EP | 0 945 112 A1 | 9/1999 | ............ A61G/5/04 |
| EP | 0 964 232 A1 | 12/1999 | ............ G01L/1/12 |
| EP | 1 181 918 A1 | 2/2002 | ............ A61G/5/04 |
| WO | WO 01/15960 | 3/2001 | ............ B62D/49/04 |

*Primary Examiner*—Tan Nguyen
(74) *Attorney, Agent, or Firm*—Wiggin & Dana, LLP

(57) ABSTRACT

A power-assist vehicle such as a wheelchair senses driving torque/force applied by a user through a transmission. The detected force/torque is utilized in a control system with a control map defining a desired dynamic of the vehicle and programmed with the desired mass and drag parameter.

29 Claims, 13 Drawing Sheets

POWER ASSIST VEHICLE

CROSS-REFERENCE TO RELATED APPLICATIONS

This patent application claims priority of U.S. Provisional Patent Application Serial No. 60/272,216 entitled "POWER ASSIST VEHICLE" that was filed on Feb. 28, 2001 and is a continuation-in-part of U.S. patent application Ser. No. 09/388,124 entitled "POWER ASSIST VEHICLE" that was filed on Aug. 31, 1999 and also a continuation-in-part of International Application PCT/US00/23815 entitled "POWER ASSIST VEHICLE" that was filed on Aug. 30, 2000. The disclosures of patent application Ser. Nos. 60/272, 216 and 09/388,124 and International Application PCT/US00/23815 are incorporated by reference in their entireties herein as if set forth at length.

BACKGROUND OF THE INVENTION (1) Field of the Invention

This invention relates to power-assist vehicles, and more particularly to power-assist wheelchairs.

(2) Description of the Related Art

A wide variety of wheelchair configurations exist. Wheelchairs generally allow a seated occupant who has little or no use of his legs to navigate from one place to another. Wheelchairs are commonly configured to be powered in one or more ways. Many wheelchairs have handles at their back to allow an attendant to push the wheelchair. Many wheelchairs may be occupant-powered, typically having a large diameter drive wheel at each side, each drive wheel having a concentric handrim which may be gripped by the occupant to rotate the drive wheel to drive the wheelchair. Motor-driven wheelchairs may be used where the occupant is unable to power the wheelchair himself. In some motor-driven wheelchairs, two electric motors are respectively coupled to the left and right drive wheels. The motors may be controlled by a joystick which can drive the wheels at different speeds to provide steering. One example of a motor-driven wheelchair with a suspension mechanism is shown in U.S. Pat. No. 4,339,013 of Gerald I. Weigt.

The '124 application discloses a power-assist wheelchair. Another power-assist wheelchair is disclosed in U.S. Pat. No. 5,818,189 (the '189 patent), the disclosure of which is incorporated by reference in its entirety herein. In a power-assist wheelchair, motor power supplements power provided by the occupant. The '124 application and '189 patent teach a motor associated with each drive wheel applying power to the drive wheel responsive to the torque applied by the occupant to the associated handrim. Electricity to power the motors may be provided one or more rechargeable batteries.

In addition to the drive wheels, wheelchairs commonly include at least one additional wheel. In a common wheelchair configuration such as illustrated in the '124 patent, there are two relatively small caster-like front wheels which freely pivot about generally vertical caster axes to permit the wheelchair to turn. Some racing wheelchairs, however, feature a single central front wheel while other wheelchairs locate the additional wheel(s) behind the drive wheels.

BRIEF SUMMARY OF THE INVENTION

In one aspect the invention is directed to a power assist vehicle. The vehicle has a drive wheel and input means for receiving a driving torque from a user. A transmission assembly couples a motor to the drive wheel to permit the motor to drive the drive wheel and couples the input means to the drive wheel so as to permit the input means to simultaneously drive the drive wheel. A control system is programmed with at least one control map defining a desired dynamic of the vehicle and programmed with a desired mass-indicative parameter and a desired drag parameter.

The control system advantageously utilizes the control map and measured values of driving torque from the user and an actual velocity to determine a desired velocity and employs a single-axis velocity servo loop to control the motor to reduce an error component between the actual velocity and the desired velocity. The desired velocity may be produced in response to an iterative integration of: measured user-applied torque multiplied by a first constant; and the negative of the sign of the desired velocity multiplied by a second constant. The desired velocity may be produced in response to an iterative integration of: measured user-applied torque multiplied by a first constant; and a damping effect provided by a function of the desired velocity.

Aspects of the invention may be implemented in a wheelchair having a pair of drive wheels and handrims.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
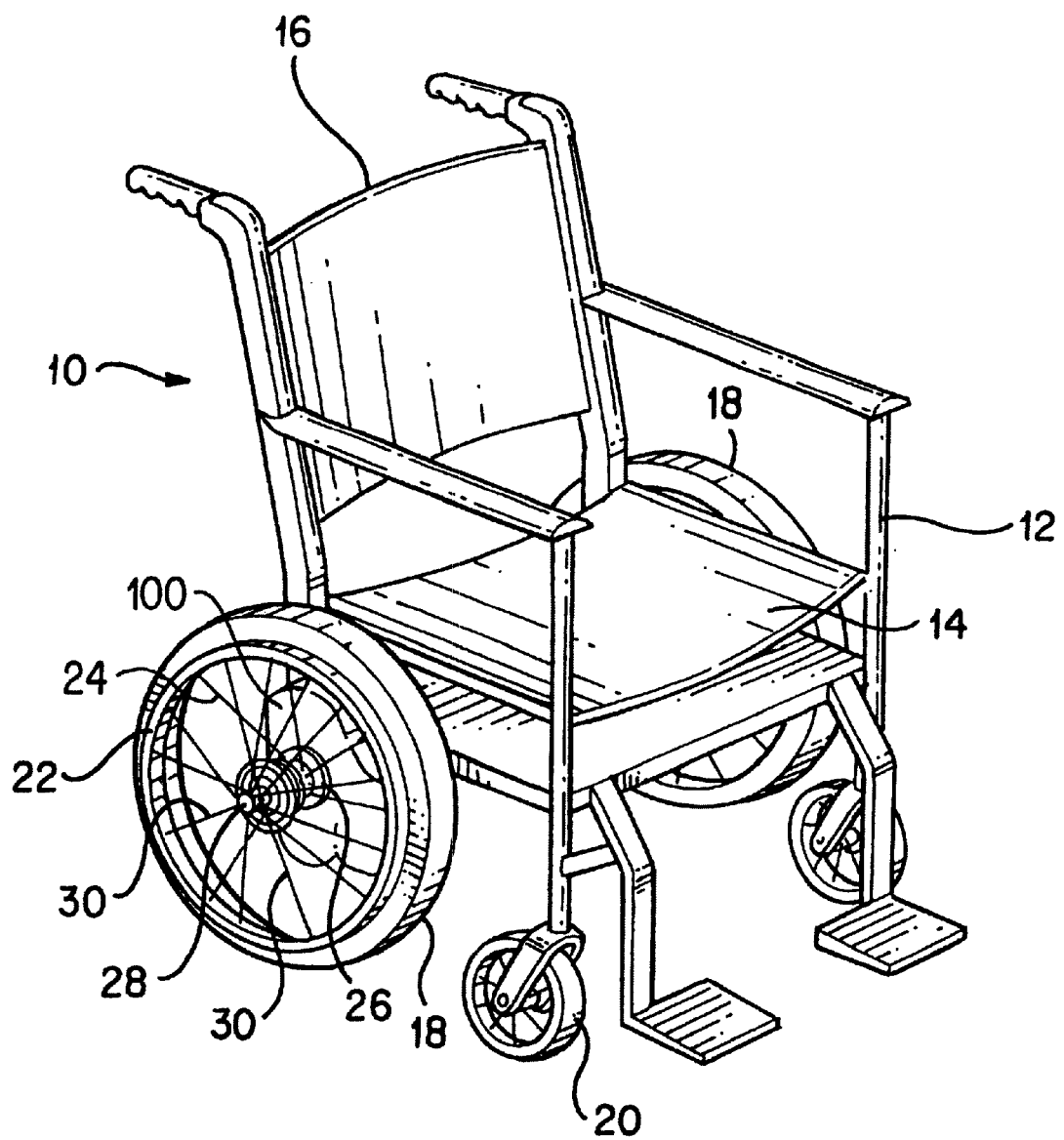
FIG. 1 is a view of a wheelchair with a gearing system of the present invention.

FIG. 1 shows an exemplary wheelchair 10 which represents one of many wheelchair configurations to which the present invention may be applied. The exemplary wheelchair includes a structural frame 12, a seat 14, a seat back 16, two ground-engaging drive wheels 18 and two ground-engaging nondriven caster wheels 20. The wheels 18 may comprise a rim and a pneumatic tire and each are associated with a coaxial handrim 22 for receiving a driving input from a user seated on the chair. Each drivewheel rim is mounted onto associated drivewheel hub 26 by drivewheel spokes 24. Each handrim is connected to an associated handrim shaft 28 by handrim spokes 30. The spokes 24 and 30 may, without limitation, be of metal or composite material or may be replaced by discs as appropriate for any particular use.

Figure 2:
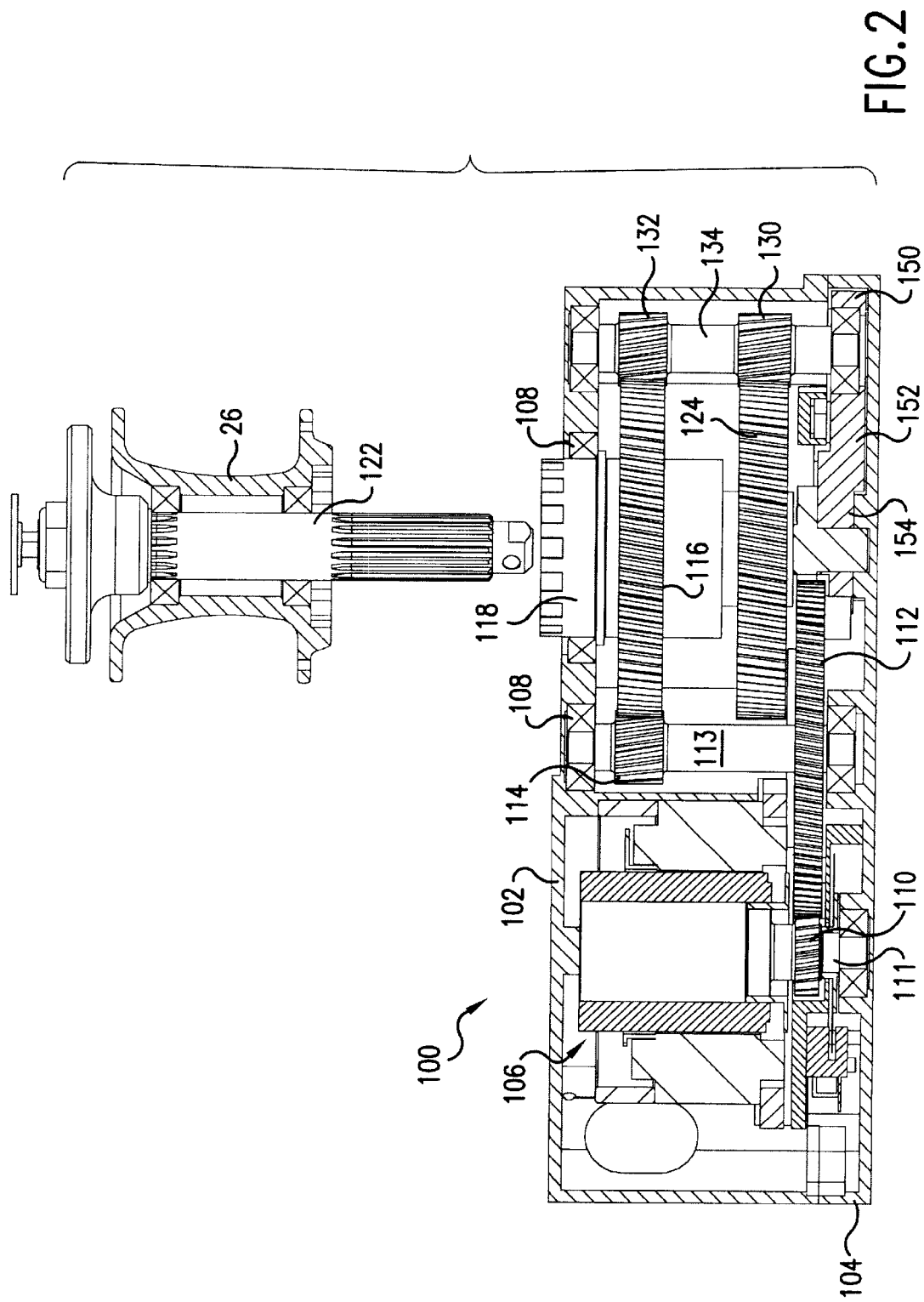
FIGS. 2 and 3 are partially exploded and partially longitudinal sectional views of a powertrain unit of the wheelchair of FIG. 1.

The exemplary wheelchair has a pair of generally mirror-image left and right powertrain units 100 respectively mounting the left and right drive wheels to the wheelchair frame. Each powertrain unit 100 (FIG. 2) includes an outboard housing (e.g., an aluminum casting) 102 mounted to the frame and an inboard cover (e.g., 6061 T6 aluminum machining) 104 bolted or screwed together. These units contain the motor (e.g., a brushless servomotor) 106 and the associated geartrain and include appropriate bores or compartments for accommodating a variety of bearings 108 supporting various shafts. The motor provides electronically controlled power assistance that augments the force applied by the user. The torque provided by the motor is transmitted through a two-stage gear reduction, preferably having spur gears. The combination of a high-performance, low-friction motor and a small reduction ratio allows for minimal drivetrain drag when the motor is unpowered, as could happen when the batteries run low or a system failure occurs.

Figure 3:
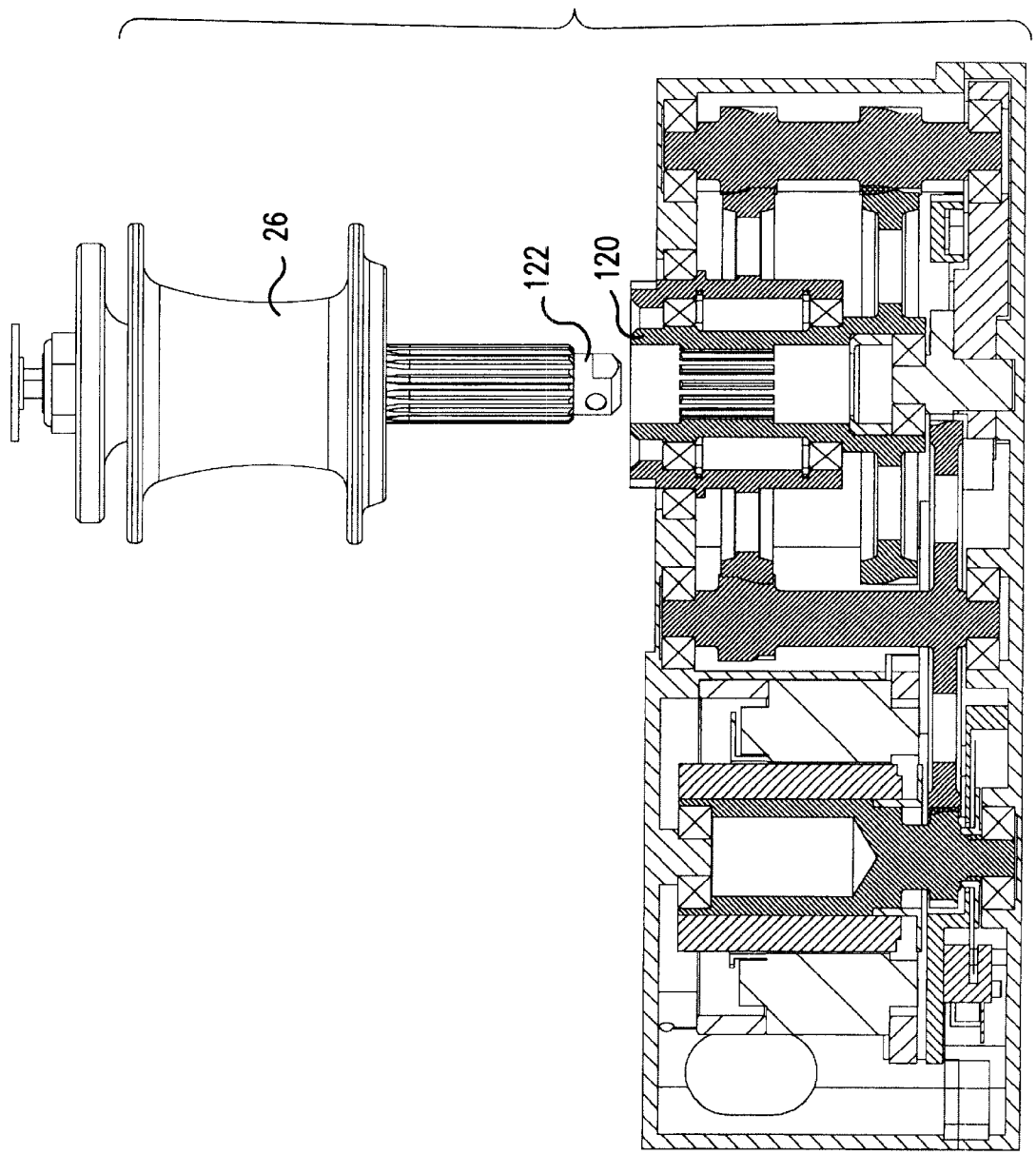

A motor drive pinion 110 on the motor shaft 111 drives a larger driven gear 112 on a second shaft 113 which provides a first stage reduction. The second shaft carries a second pinion 114 driving a larger output gear 116 (providing a second stage reduction) connected to the wheel hub 26 by a splined or otherwise faceted hollow shaft 118. A coaxial shaft 120 (FIG. 3) with splines or other features for connecting to the handrim shaft 122 is located within the shaft 118 and carries a second large gear 124 (FIG. 2) which, in the illustrated embodiment, is identical in diameter to the gear 116. The gears 124 and 116 are respectively engaged to identical smaller pinion gears 130 and 132 rigidly mounted on a common shaft 134. In the illustrated embodiment this arrangement links the handrim to the drivewheel with a 1:1 gear ratio.

Figure 4:
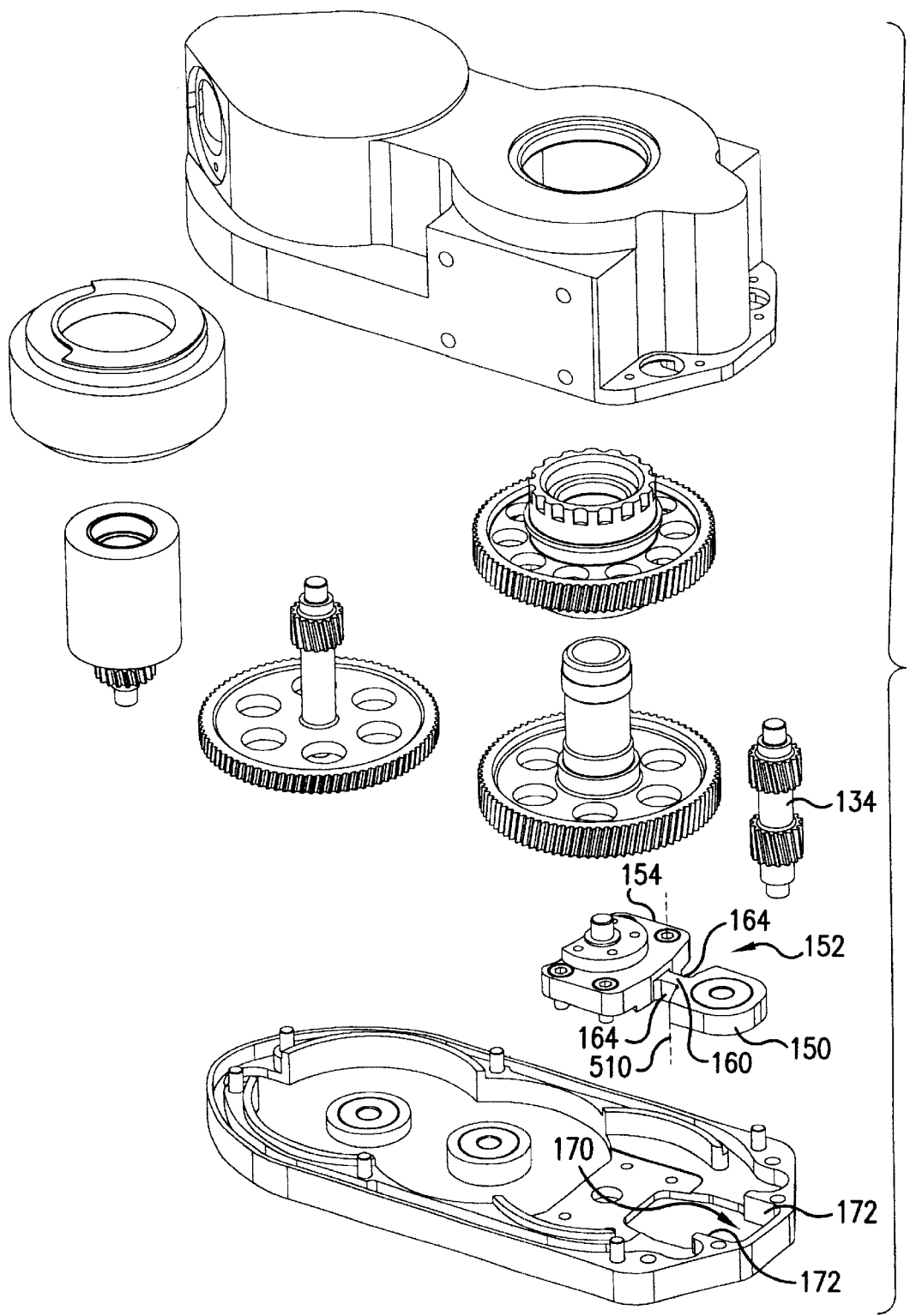
FIG. 4 is a first partially exploded view of the powertrain unit of FIGS. 2 and 3.
Figure 5:
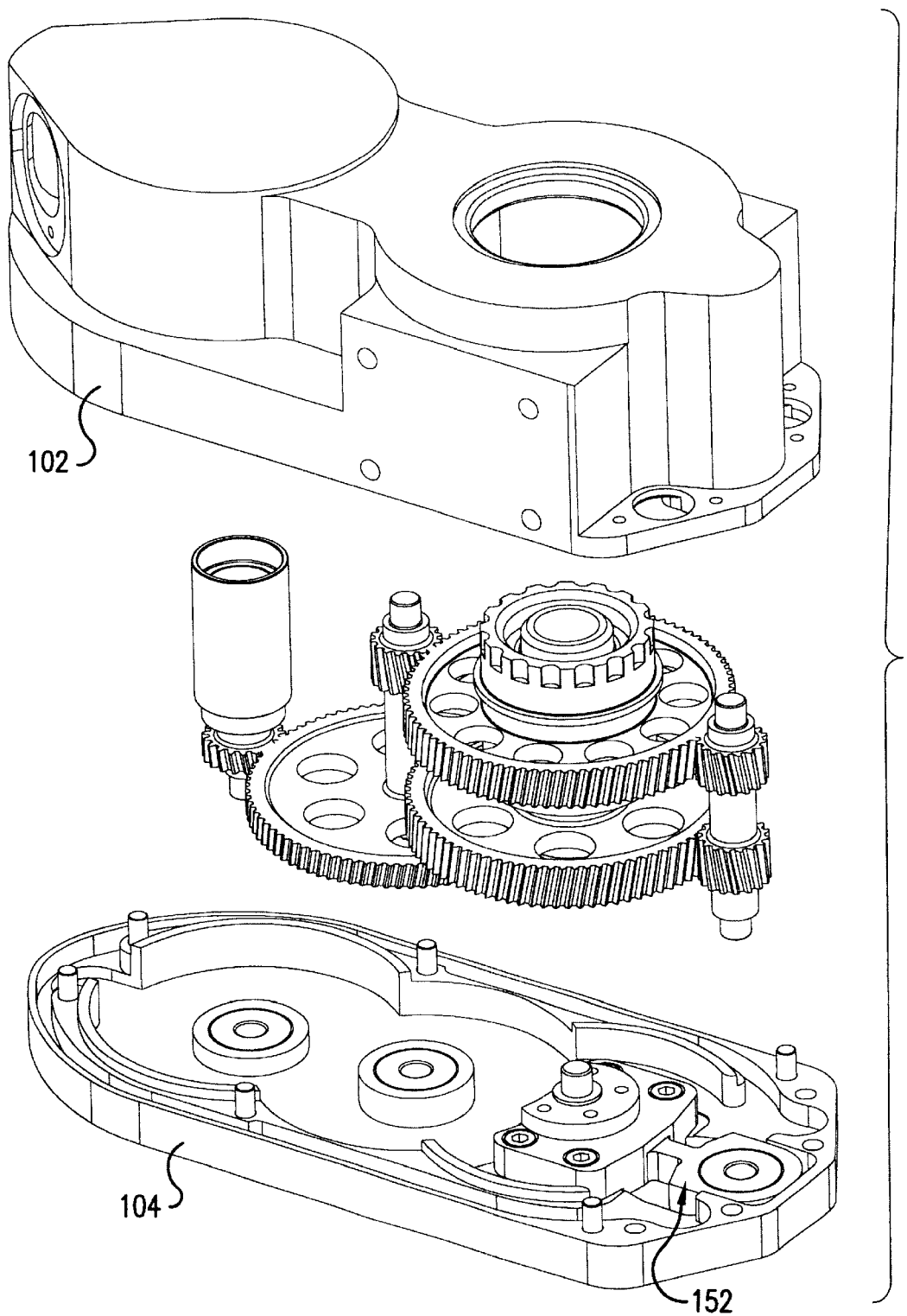
FIG. 5 is a second partially exploded view of the powertrain unit of FIGS. 2 and 3.

One end of the shaft 134 is rigidly held by the housing. The other end is held by a distal end 150 of a sensor arm 152 (e.g., of 6061 T6 aluminum). The proximal end 154 is rigidly secured to the cover (e.g., by screws). Intermediate its two ends, the sensor arm has a narrowed neck 160 (FIG. 4). The thin neck permits the sensor arm to flex slightly under load as if about a central transverse axis 510 (e.g., an axis parallel to the various shaft axes). The two opposite faces of the neck 160 bear strain gauges 164 mounted so that the strain gauges measure such flexing. The flexing is constrained by the close accommodation of the distal end 150 within a compartment 170 (FIG. 5) of the cover. During assembly, the distal end is shimmed between opposite faces 172 of the compartment and the mounting screws tightened to secure the proximal end. The shims are removed, establishing a neutral centered position for the distal end.

The transmission of torque between the gears 124 and 116 (and thus the handrim and drivewheel) via the pinion gears 130 and 132 applies a torque to the shaft 134 about a longitudinal axis perpendicular to the shaft axis. This torque is transmitted through the bearings supporting the shaft and thus to the housing at one end and to the distal end of the sensor arm at the other end. This causes the flexing of the neck 160. Accordingly, the direction and magnitude of such flexing provides a measure of the direction and magnitude of the torque between the handrim and drivewheel and thus the strain gauge output may be used to measure such torque.

Figure 6:
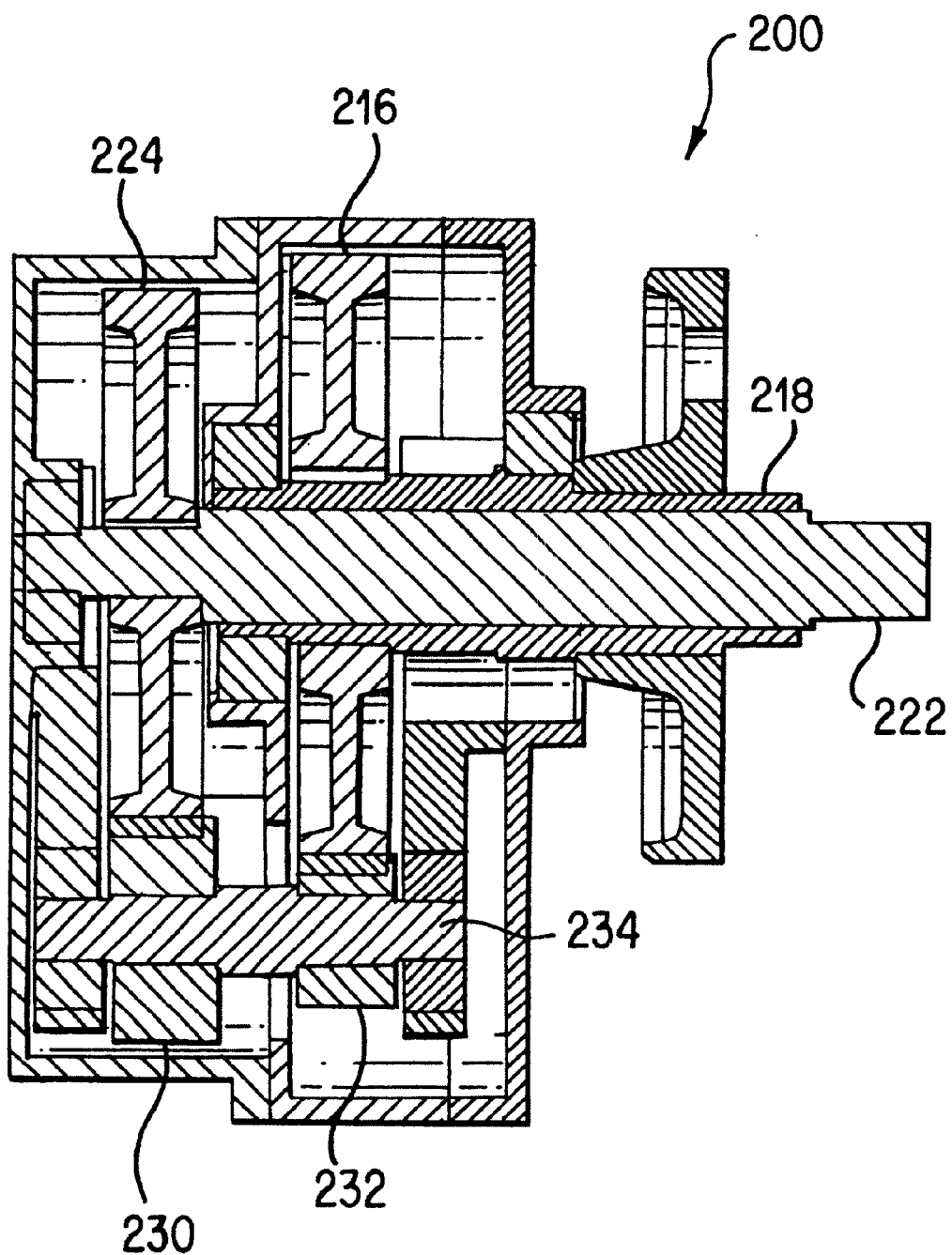
FIG. 6 is a longitudinal sectional view of an alternate powertrain unit.

The geartrain transmission of the illustrated powertrain unit 100 provides a 1:1 ratio between handrim and drivewheel rotation. This provides an intuitive, familiar, feel for many users. In various other implementations, the powertrain units may be provided with a ratio other than 1:1 (e.g., within a range of 0.5:1 to 2:1). The 1:1 ratio between handrim and drivewheel rotation provides an intuitive, familiar feel for many users. A higher reduction may be useful for low speed applications whereas a low ratio may be useful for higher speed applications such as sport wheelchairs. FIG. 6 shows a powertrain transmission unit 200 configured to provide a numerical advantage for the user and is drawn from U.S. Ser. No. 09/388,124. In the transmission unit 200, illustrated gears 216, 224, 230, and 232 are analogous to gears 116, 124, 130, and 132 of the transmission unit 100. Shafts 218, 222, and 234 are analogous to shafts 118, 122, and 134. The motor and portion of the geartrain coupling it to the gear 216 are not seen in this view.

Figure 7:
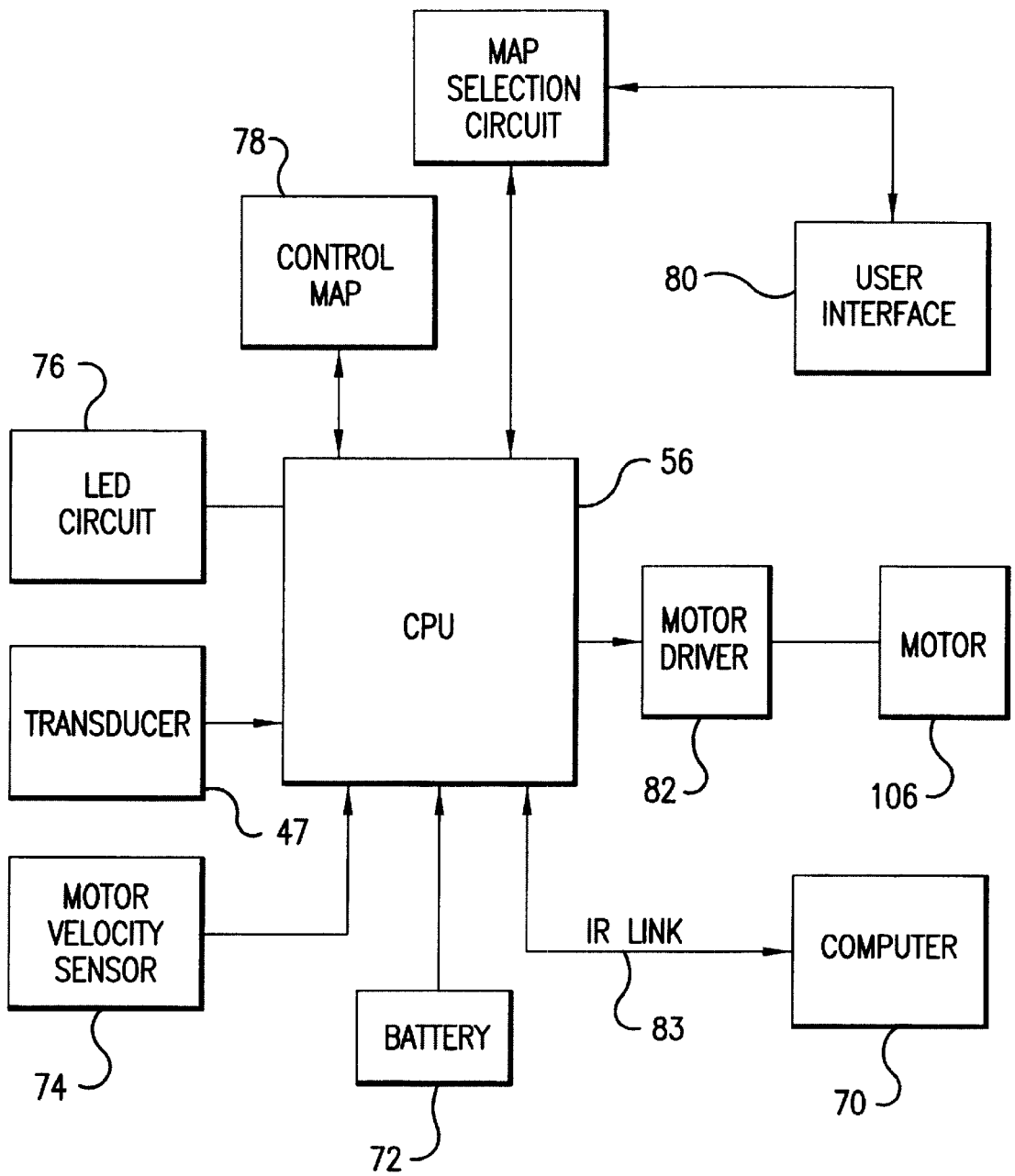
FIG. 7 is a control system schematic for use with the powertrain unit of FIGS. 2 and 3.

Turning to FIG. 7, the handrim torque transducer 47 (formed by the bridging of strain gauges 164) measures a parameter indicative of the handrim torque $T_h$ and transmits this value to a central processing unit (CPU) 56. Specifically, FIG. 7 shows components of a control system and the data passing between these components. The exemplary control system comprises an external personal computer-based component 70, a battery 72, a velocity sensor 74, the torque transducer 47, a LED circuit 76, a control map 78 and associated circuitry, a user interface 80, the CPU 56, and the motor 106 having an associated motor driver 82. The control map 78 may be either constant to the system or selectable by the user through the interface 80 with the CPU 56.

The control system operates through the CPU 56, which is preferably implemented as a programmable microprocessor. The circuitry for the control system is housed in a control box (not shown) that is, preferably, either integral with the drive unit/gear box or encased in a separate enclosure mounted on the frame. The control system operates so that the user supplies a tangential force and associated torque to the handrims 22 that is measured by the associated torque transducers 47. Each torque transducer 47 transmits this value to the CPU 56, which utilizes a desired dynamic or control map to transform the measured torque value into a desired drive wheel velocity. The desired dynamic may be programmed into the CPU and may be specifically configured to meet the needs of the individual user. A velocity servo loop is used as an error measure to ensure proper system output based upon the selected control map. The sensor 74 measures the actual drivewheel velocity and compares that value against the optimum or desired value through the velocity servo loop. The motor output is then increased or decreased to reduce the error component to the optimum value of zero.

To put this concept in operation, the CPU 56 accepts torque input from the torque transducer 47, command input from the interface 80 (when used) and velocity input from the sensor 74. In response, the CPU 56 outputs a control signal to the motor 24 via the motor driver 82. The CPU 56 is preferably programmable through the use of the PC-based computer 70 having associated memory storage. Resident on the computer is a design tool for specifying and downloading these control maps to the CPU 56. The infra-red (IR) link 83 facilitates data transfer between the CPU 56 and the external computer 70.

The CPU 56 also directs information downloaded from the data link, such as control maps, to an electrically erasable programmable read only memory (EEPROM). And, if the data link is appropriately configured to output information, the processor can upload data from a DRAM, or other volatile memory, via the data link. Software for governing the operation of the CPU 56 may also reside here. Furthermore, the CPU 56 may, upon request by the PC-based system 70, upload information that it has stored. Downloading and uploading are preferably performed by an infrared data link, although cabling, wireless data links, modems and other data exchange means may also be used.

The various control maps may be accessed by the user through the use of the interface 80 between the user and the CPU. The interface 80 is provided with a switch 90 that allows the user to select between the various control maps pre-programmed into the CPU. The interface 80 may also have a display comprising a series of LEDs 76 used to indicate which control map has been selected by the user. Alternate displays (not shown), such as liquid crystal devices, displaying this information, along with other status data may be used in place of, or in addition to, the LEDs. The (IR) port 83 facilitates communication with the PC-based component 70 to upload such data, and also to download control maps and other software. As stated above, other data links may be used in place of the IR port.

Figure 8:
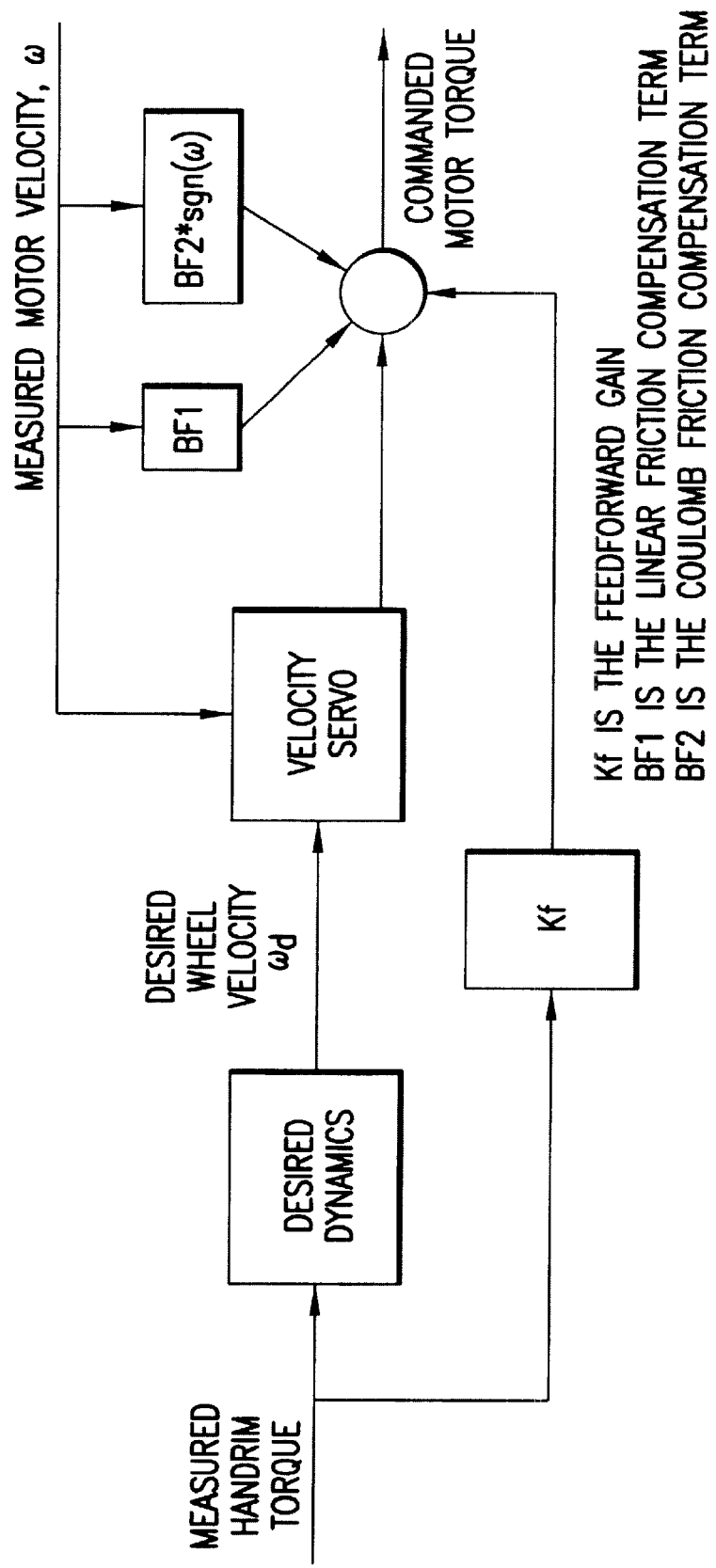
FIG. 8 is a flow chart of an overall control method for use with the powertrain unit of FIGS. 2 and 3.
Figure 9:
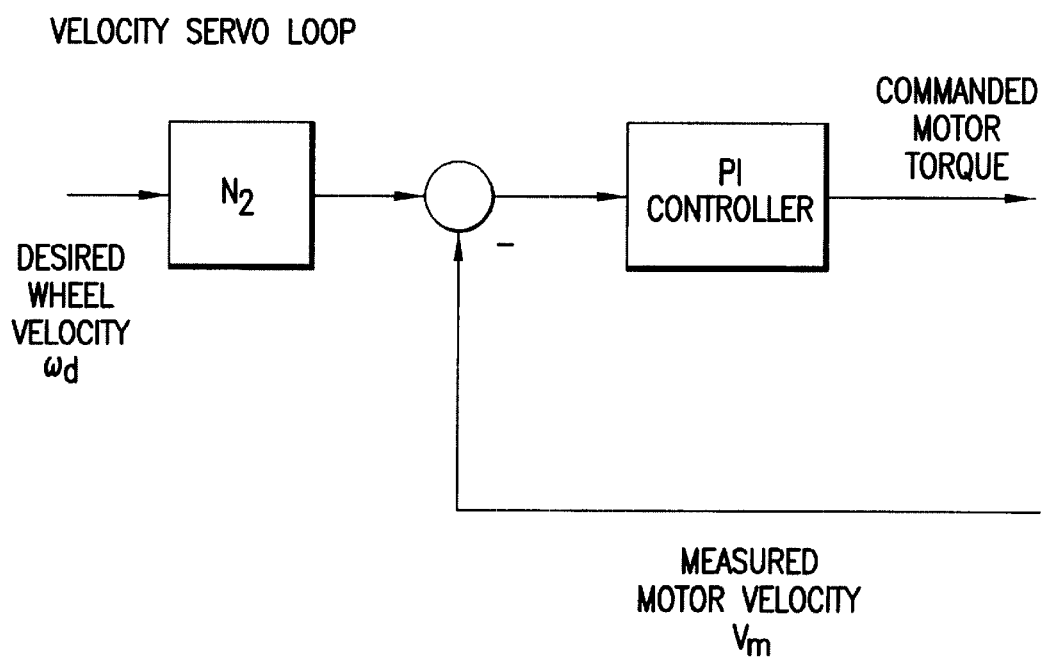
FIG. 9 is a flow diagram of a velocity servo loop portion of the method of FIG. 8.
Figure 10:
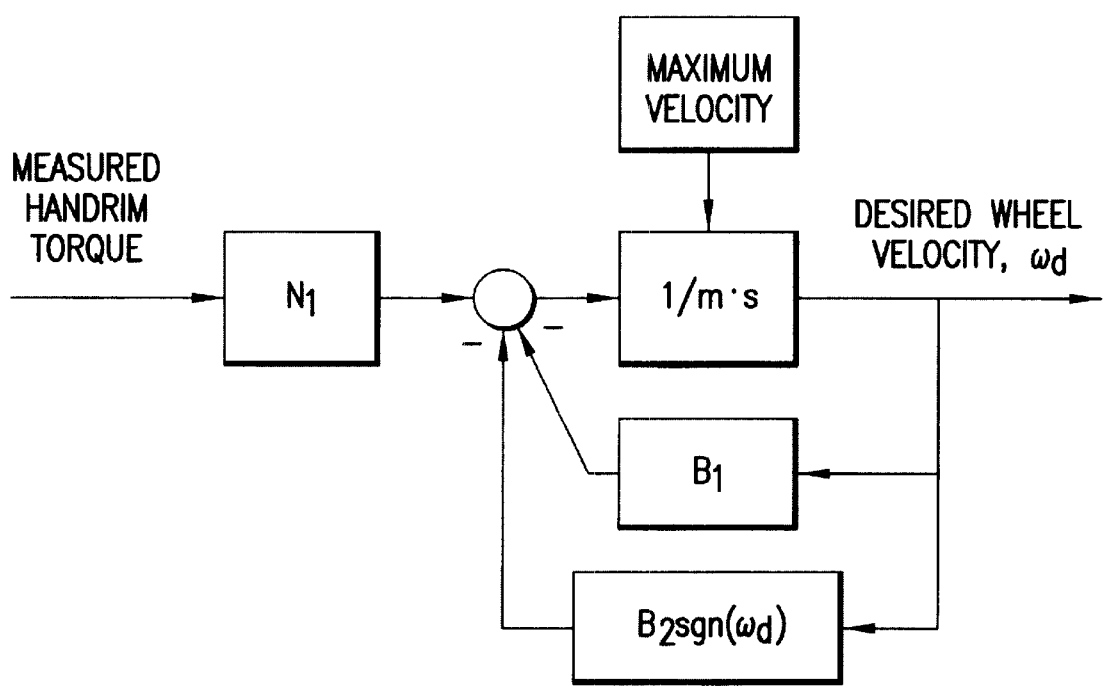
FIG. 10 is a flow diagram of desired dynamics of the method of FIG. 8.
Figure 11:
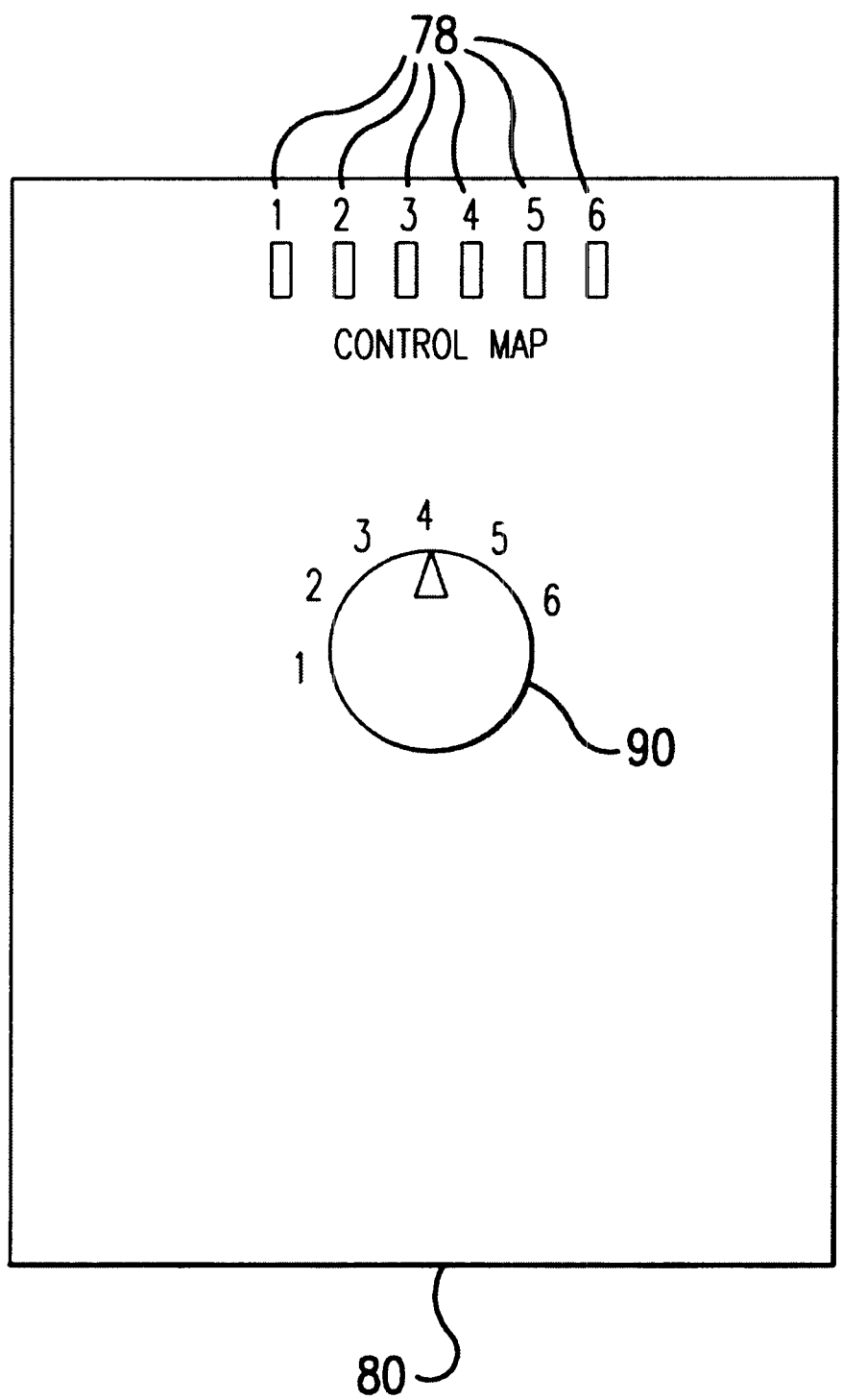
FIG. 11 is a semi-schematic illustration of a user interface for controlling the powertrain units of FIGS. 2 and 3.

Once the user selects the desired control map, the CPU is ready to compute the desired system output. FIG. 8 shows a control flow utilizing a velocity servo loop (FIG. 9) and a desired dynamics bock (FIG. 10). Computing the desired wheel velocity $\omega^)d$ (FIG. 8) is based upon the following algorithms:

$$\omega_d = 1/m[N_1 T_h - B_1 \omega_d - B_2 \text{sgn}(\omega_d)]$$

$$\omega_d = \min(\omega_d, \omega_{d\ max})$$

$$\omega_d = \max(\omega_d, -\omega_{d\ max})$$

In the above formulas, $N_1$ is the gear ratio between the handrim 22 to the outer drivewheel 18, m is a constant proportional to the desired mass of the system, $B_1$ is the desired linear damping, $B_2$ is the desired coulomb damping, and $\omega_d$ represents the first derivative with respect to time (integrated by 1/s, FIG. 10). Due to the above formulas, the present invention is structured and tuned to mimic a wheelchair-like system with specific inertia and prescribed drag (combination of linear and coulomb friction) on a smooth, level surface.

FIG. 8 also shows use of a particularly optional feedforward signal path from the measured handrim torque. The feedforward path applies a fixed ratio of torque to the motor, where the ratio is determined by the gain, $K_F$. When the system utilizes the feedforward path, the desired wheel velocity $T_d$ is computed based upon the same algorithm described above. $K_F$ is the feedforward gain, $B_{F1}$ is the linear friction compensation term and $B_{F2}$ is the coulomb friction compensation term. Both the linear and coulomb friction compensation terms are used to eliminate natural friction in the system. These components ($B_{F1}$ & $B_{F2}$) add torque based upon speed, either linearly for BFI or based on the sign of speed for $B_{B2}$. The wheelchair may utilize the feedforward term in both servo mode and by itself in feedforward mode. In servo mode, it helps the control system respond more quickly to operator input. Alone, it provides torque augmentation.

The variables in the above formula can be altered over a wide range to tailor the control map to the specific needs of the user. For example, by specifying low inertia, the system will accelerate and decelerate more strongly in response to a torque input at the handrims. The net effect is that the operators inputs are amplified by the reciprocal of the system mass. This is referred as the "sensitivity" of the system. The exemplary embodiment includes two types of damping, linear and coulomb. These damping terms are used both to tailor the response of the system to the needs of the user and to provide system stability. For example, the damping terms help the operator bring the speed to zero when desired and also keep the commanded speed at zero despite small offsets in the torque sensors. The linear damping term provides a resistive torque proportional to the desired speed that is similar to moving through a viscous fluid. The coulomb damping term provides a resistive torque of fixed magnitude that is similar to sliding an object across a smooth surface.

Other forms of damping may also be incorporated into the system, such as quadratic drag where the force increases with the square of the magnitude of the velocity. Increasing any damping term causes the desired velocity to return to zero more quickly in the absence of an applied torque input. At steady velocity, the drag terms set the amount of applied torque required to maintain that speed. If the damping terms are decreased, the chair will maintain its speed longer without additional torque input. The velocity limit simply prevents the desired velocity from exceeding a preset magnitude. From the user point of view, this feels much like heavy damping that cuts the limiting speed.

Advantageously there are regenerative capabilities. For example, when the motor is slowing down the wheelchair (as it does when in servo mode going downhill) power is routed back into the battery. Similarly, the chair brakes actively on level ground when the terms $B_1$ and $B_2$ (FIG. 10) reduce the desired velocity, and the velocity controller reduces the actual speed by applying the appropriate opposing torque. Then the regenerative action transfers energy from the kinetic energy of the moving mass back into the battery. Whenever the applied torque and velocity have opposite signs, the system puts much of the resulting dissipated power back into the battery. This capability is unique to the low-friction environment of the present system. This environment allows the wheelchair to coast when no current is applied.

The desired dynamic (or control map) is created by varying these parameters in association with the combination of the computer control system, the sensors, and the entire electromagnetic system (motors, gearing, etc). Due to the linearity of the torque motor, the low friction and low backlash of the gears, and the quality of the sensors, the computer control system can shape the overall dynamic system response over a wide range. Although the present invention will operate with high-friction, high-reduction gearing, this is not desirable because these components may constrain the ability to specify a desired system behavior. Referring to FIG. 9, once the desired wheel velocity $\omega_d$ has been computed based upon the selected control map, the control circuitry computes the desired motor output through the use of a single-axis velocity servo loop. The velocity servo loop alters the motor torque to maintain the desired wheel velocity cd despite changes in friction (external and internal) or gravity loads imposed by sloped terrains. The measured motor velocity $V_m$ is obtained through the use of the sensor 74 associated with the motor 24. Preferably, the sensor is an optical encoder mounted on the corresponding motor 24.

Referring to FIG. 7, the controller uses the desired motor output to transmit an appropriate control signal to the motor 24. This signal contains magnitude and polarity information which are presented to the motor driver 82 to produce an appropriate motor output. The motor driver 82 converts this signal into a voltage of the appropriate magnitude and polarity to be applied to the motor 24. For this, the motor driver comprises a digital-to-analog converter (DAC), and an H-bridge circuit. The DAC converts the control signal into an analog signal to be applied to the H-bridge circuit, and the H-bridge circuit uses this signal, along with polarity information, to drive the motor 24.

The gearing and control systems, described above, are duplicated for each wheel. Due to the independence of each wheel, the control system parameters can be varied to accommodate the user's particular needs. For example, if the user has less strength in one arm, the associated side of the wheelchair can be made more sensitive by reducing the mass and drag parameters. Alternatively, both systems can be coupled to produce a uniform response (e.g., with full or partial integration of the control components).

An exemplary controller has two parts implemented in a digital signal processor (DSP) and a programmable interrupt controller (PIC). The PIC handles the interface to the strain gauge bridge, implements the high-level algorithm, and allows for mode changes. The DSP closes a velocity loop with programmable proportional and integral gains and current limit, with some additional features.

The PIC communicates with the DSP, sending desired speed and an additive current term. The DSP reports back the actual speed and total current. These communications can be implemented using analog or high speed digital communications such as serial peripheral interface (SPI). An additional serial interface between the PIC and DSP is used to provide configuration data to the DSP on startup.

Figure 12:
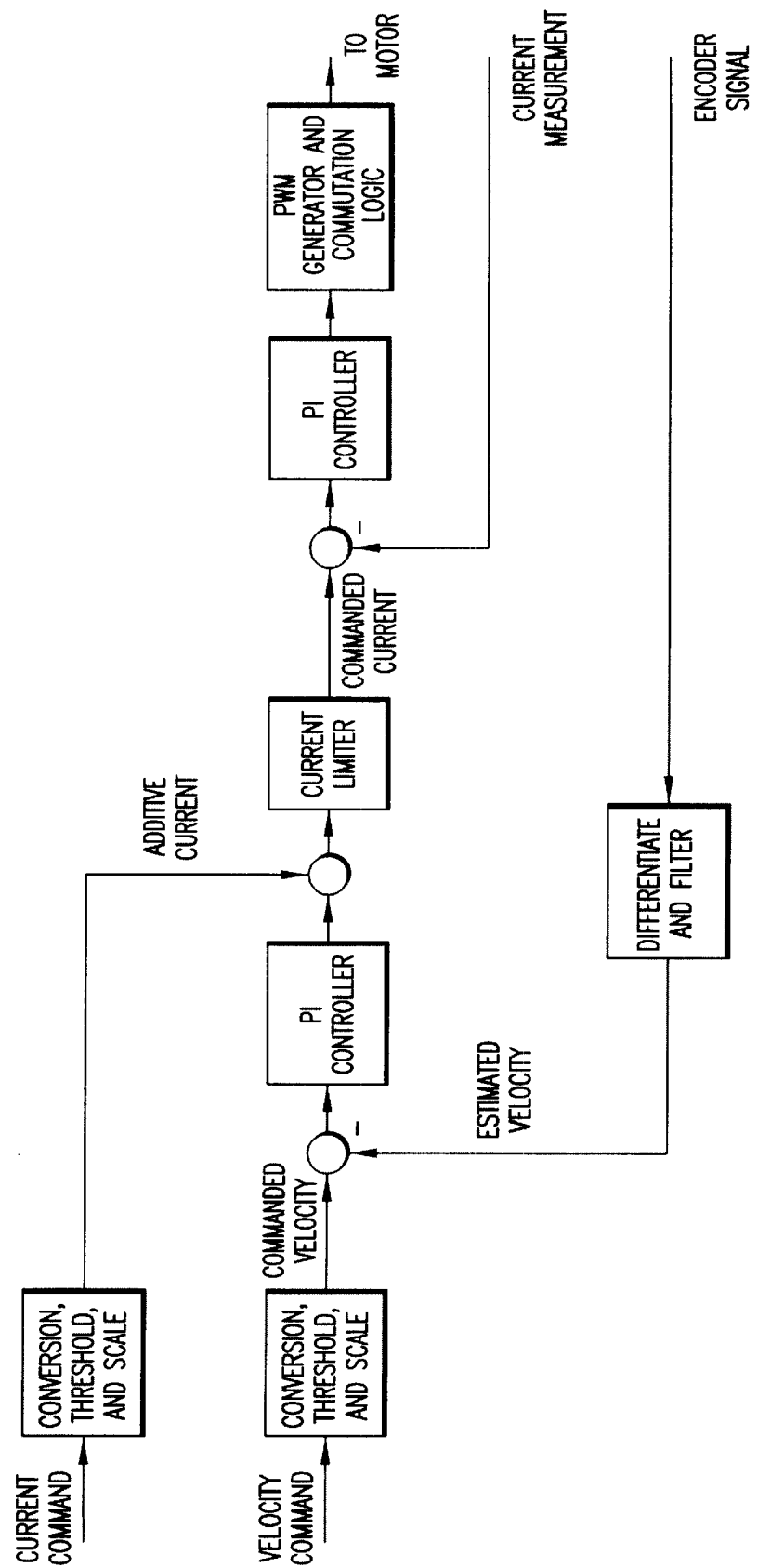
FIG. 12 is a block diagram of velocity and current controller.

FIG. 12 shows velocity and current controllers. The DSP implements sinusoidal or 6-step commutation (software selectable). It has an inner loop consisting of a current servo, and an outer loop that implements a velocity servo. The current loop produces a current equal to the current demanded by the velocity servo plus the additional current term provided by the PIC. The DSP controller also has a programmable current limit.

The velocity servo uses a PI algorithm to compute the current needed to obtain the commanded speed. An additional controller then servos the pulse-width-modulated signal to ensure that the desired current is obtained.

Figure 13:
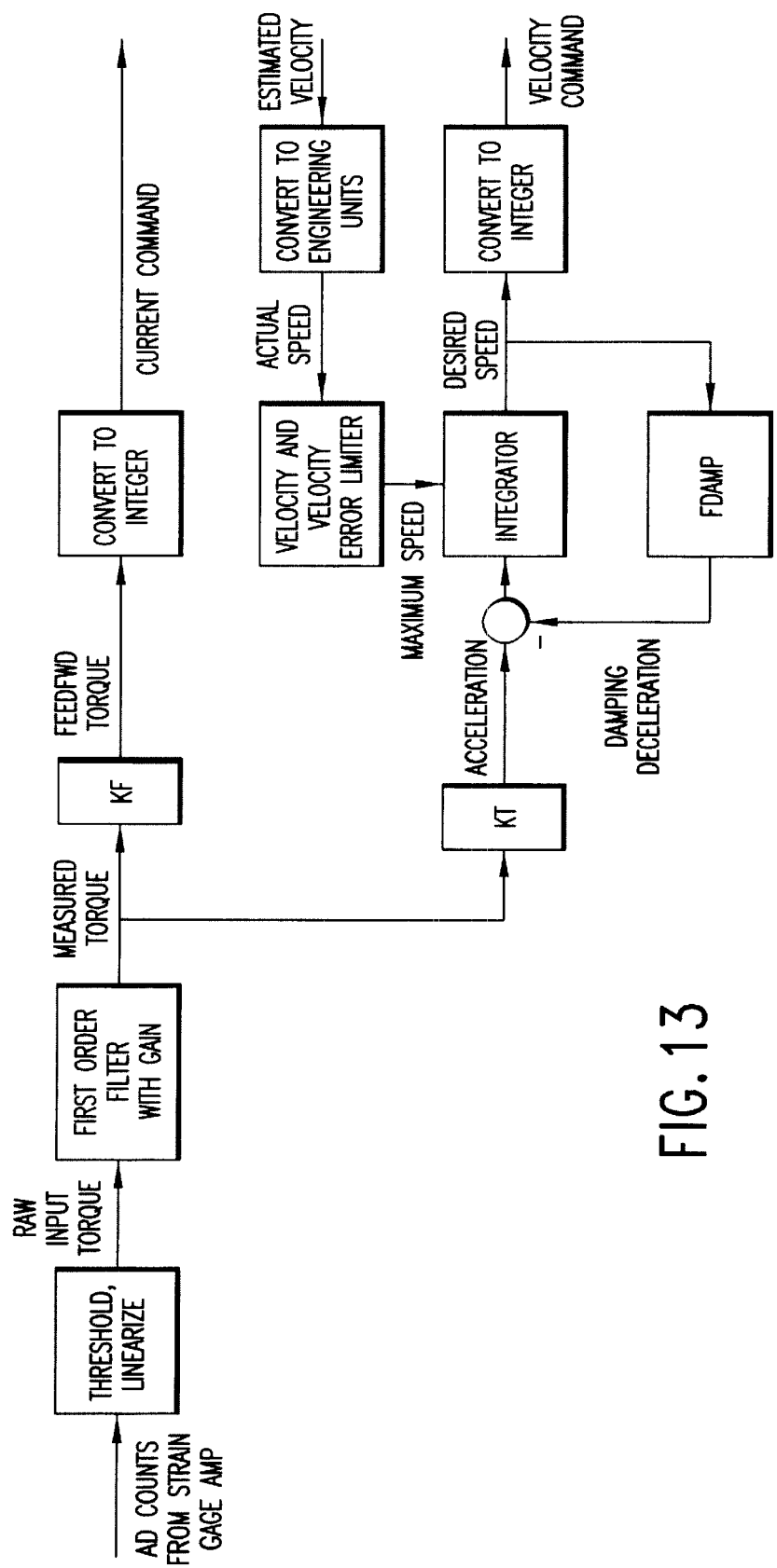
FIG. 13 is a block diagram of a control algorithm.

FIG. 13 is a block diagram of the algorithm. The high-level algorithm resides in the PIC. It computes the desired velocity and additive current terms that will be implemented by the DSP.

In the first stage of processing, the raw AD signal from the strain gauge amplifier is converted into a torque value. To convert AD counts to a floating point torque value, the zero value is removed, a threshold applied, then appropriate gains are applied for either a positive or negative value. A digital first-order filter is then applied.

The feedforward torque is a scaled version of the input torque. After the input torque is scaled, it is converted into an integer value for the DA or SPI.

The desired velocity computation is a bit more complicated. An acceleration parameter, Kt is applied to the input torque to produce an acceleration term. A deceleration term is computed from the sign of the desired velocity and a parameter that emulates coulomb friction. This is the function Fdamp. The sum of the acceleration term and the deceleration term is then integrated to produce a desired velocity. The desired velocity is always kept within a specified value of the actual velocity to prevent "surging", which can occur when the velocity controller saturates (velocity limiter block in FIG. 13). If the desired velocity exceeds the actual velocity by more than a preset amount (a maximum velocity error), the desired velocity is reset to the actual velocity plus the amount (or minus the amount for negative desired velocities). The desired velocity is finally converted to an appropriate value for either DA or SPI.

One or more embodiments of the present invention have been described. Nevertheless, it will be understood that various modifications may be made without departing from the spirit and scope of the invention. Accordingly, other embodiments are within the scope of the following claims.

What is claimed is:

1. A gearing system for use in a motor assisted vehicle including at least a drive wheel rotatably connected to a frame comprising:

a power input device for receiving an input force from a user;

a first gear assembly coupling the power input device to the drive wheel and operatively associated with a transducer, the transducer being configured to output at least one signal indicative of the input force received by the power input device;

a second gear assembly operatively associated with a motor and coupling the motor to the drive wheel;

a sensor configured to output at least one signal indicative of a motion of either of the motor or the drive wheel; and a controller electrically connected to the sensor and to the transducer, the controller being configured to receive the output signal from the sensor and the output signal from the transducer, to compute a control signal based upon one of at least one programmed function, and to output the control signal to the motor.

2. The gearing system of claim 1 wherein the controller comprises:

a computing device for determining the control signal from the transducer signal using one of the at least one programmed function; and a motor driver electrically connected to the computing device for transmitting the control signal to the motor, the control signal including a voltage and a polarity for controlling a speed and a direction of the motor.

3. The gearing system of claim 2 wherein the motor driver comprises:

a digital-to-analog converter for producing said voltage for controlling the speed of the motor; and an H-bridge circuit for determining the polarity for controlling the direction of the motor.

4. The gearing system of claim 2 wherein the computing device is a microprocessor.

5. The gearing system of claim 1 wherein the controller further comprises a memory for storing the at least one programmed function.

6. The gearing system of claim 5 wherein the memory is an electrically erasable programmable read only memory.

7. The gearing system of claim 1 wherein sensor output signal is operatively associated with an error correction program.

8. The gearing system of claim 1 wherein the controller is operatively associated with an external computer, the external computer having at least one input/output port and being configured to receive a functional input, and to output a programmed function to the controller.

9. The gearing system of claim 8 wherein the at least one input/output port includes an infrared port.

10. The gearing system of claim 1 wherein the controller is operatively associated with a user interface, the interface comprising:

a switch for selecting a programmed function; and a display for identifying the selected function.

11. A gearing system for use with a motor assisted vehicle including at least a drive wheel rotatably connected to a frame comprising:

a power input device for receiving a first input force from a user to power the vehicle;

a gear assembly operatively connecting the input device to the drive wheel;

a motor operatively associated with the gear assembly for providing a torque to the drive wheel and thereby provide a second force to power the vehicle;

a transducer configured to output at least one signal indicative of the first input force;

a sensor configured to output at least one signal indicative of a motion of either of the motor or the drive wheel; and a controller electrically connected to the sensor and to the transducer, the controller being configured to receive the output signal from the sensor and the output signal from the transducer, to compute a control signal based upon one of at least one programmed function, and to output the control signal to the motor.

12. A gearing system for use with a wheelchair including at least a drive wheel rotatably connected to a frame comprising:

a first gear assembly operatively associated with a handrim and a transducer, the transducer being configured to output at least one signal indicative of a force applied to the handrim by a user;

a second gear assembly operatively associated with a motor;

a sensor configured to output at least one signal indicative of a motion of either of the motor or the drive wheel; and a controller electrically connected to the sensor and to the transducer, the controller being configured to receive the output signal from the sensor and the output signal from the transducer, to compute a control signal based upon one of at least one programmed function, and to output the control signal to the motor.

13. The gearing system of claim 12 wherein the controller comprises:

a computing device for determining the control signal from the transducer signal using one of the at least one programmed function; and a motor driver electrically connected to the computing device for transmitting the control signal to the motor, the control signal including a voltage and a polarity for controlling a speed and a direction of the motor.

14. The gearing system of claim 13 wherein the computing device is a microprocessor.

15. The gearing system of claim 13 wherein the motor driver comprises:

a digital-to-analog converter for producing said voltage for controlling the speed of the motor; and an H-bridge circuit for determining the polarity for controlling the direction of the motor.

16. The gearing system of claim 12 wherein the controller further comprises a memory for storing the at least one programmed function.

17. The gearing system of claim 16 wherein the memory is an electrically erasable programmable read only memory.

18. The gearing system of claim 12 further comprising an external computer having at least one input/output port, the external computer configured to receive a functional input, and to output a programmed function to the controller.

19. The gearing system of claim 18 wherein the at least one input/output port includes an infrared port.

20. The gearing system of claim 12 wherein the controller is operatively associated with a user interface, the interface comprising:

a switch for selecting a programmed function; and a display for identifying the selected function.

21. A gearing system for use with a wheelchair including at least a drive wheel rotatably connected to a frame comprising:

a handrim configured to receive an input force from a user for providing a first torque to the drive wheel;

a gear assembly operatively connecting the handrim to the drive wheel for transmitting said first torque;

a motor operatively associated with the gear assembly for providing a second torque to the drive wheel;

a transducer configured to output at least one signal indicative of the user input;

a sensor configured to output at least one signal indicative of a motion of either of the motor or the drive wheel; and a controller electrically connected to the sensor and to the transducer, the controller being configured to receive the output signal from the sensor and the output signal from the transducer, to compute a control signal based upon one of at least one programmed function, and to output the control signal to the motor.

22. A drive assembly for driving a drive wheel of a wheelchair, comprising:

a handrim for the application of torque by a user;

a handrim shaft carrying the handrim and extending coaxially through a hub of the drive wheel;

a motor driving a driven element secured coaxially to the hub;

a gear assembly operatively connecting the handrim shaft to the wheel hub to permit the handrim to drive the drive wheel; and a sensor coupled to the gear assembly for measuring a parameter indicative of the torque applied by the user and providing output utilized to control the motor.

23. A wheelchair comprising:

first and second drive wheels each having an axis and a coaxial handrim for receiving a driving torque from a user;

for each of the first and second drive wheels:

a motor; and a transmission assembly coupling the motor to the drive wheel to permit the motor to drive the drive wheel and coupling the associated handrim to the drive wheel so as to permit the handrim to simultaneously drive the drive wheel; and a control system programmed with at least one control map defining a desired dynamic of the wheelchair and programmed with a desired mass parameter and a desired drag parameter, the control system utilizing said control map and measured values of said driving torque from said user and an actual velocity to determine a desired velocity and control the motor to reduce an error component between said actual velocity and said desired velocity.

24. The wheelchair of claim 23 wherein said drag parameter comprises a coulomb damping parameter.

25. The wheelchair of claim 23 wherein said drag parameter further includes a linear damping parameter.

26. The wheelchair of claim 23 wherein said desired velocity is produced in response to an iterative integration of:

measured handrim torque multiplied by a first constant;

the negative of the desired velocity multiplied by a second constant; and the negative of the sign of the desired velocity multiplied by a third constant.

27. A power assist vehicle comprising:

a drive wheel;

input means for receiving a driving torque from a user;

a motor;

a transmission assembly coupling the motor to the drive wheel to permit the motor to drive the drive wheel and coupling the input means to the drive wheel so as to permit the input means to simultaneously drive the drive wheel; and a control system programmed with at least one control map defining a desired dynamic of the vehicle and programmed with a desired mass parameter and a desired drag parameter, the control system utilizing said control map and measured values of said driving torque from said user and an actual velocity to determine a desired velocity and employs a single-axis velocity servo loop to control the motor to reduce an error component between said actual velocity and said desired velocity.

28. The wheelchair of claim 27 wherein said desired velocity is produced in response to an iterative integration of:

measured user-applied torque multiplied by a first constant; and the negative of the sign of the desired velocity multiplied by a second constant.

29. The wheelchair of claim 27 wherein said desired velocity is produced in response to an iterative integration of:

measured user-applied torque multiplied by a first constant; and a damping effect provided by a function of the desired velocity.

* * * * *